Oct. 28, 1952    H. A. ROBERGE    2,615,484
PRODUCTION OF STICKS
Filed Jan. 3, 1947    2 SHEETS—SHEET 2
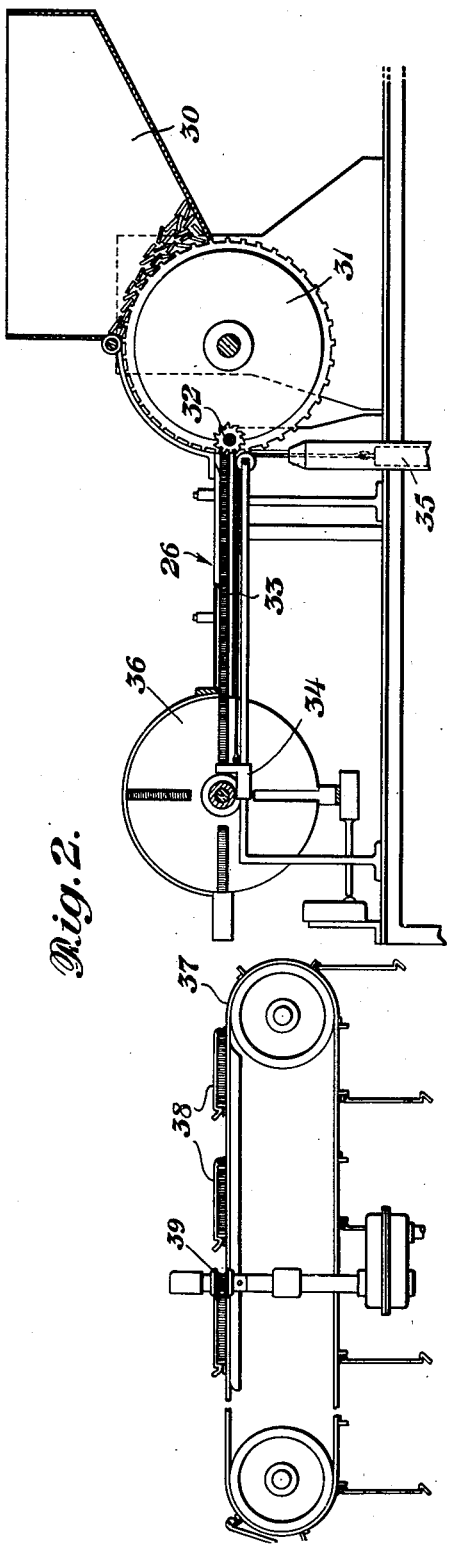
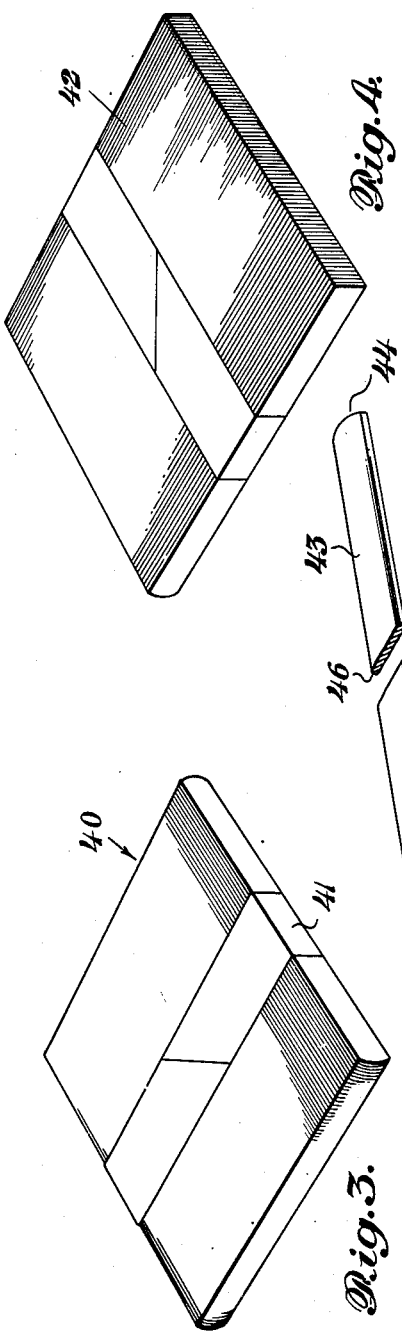
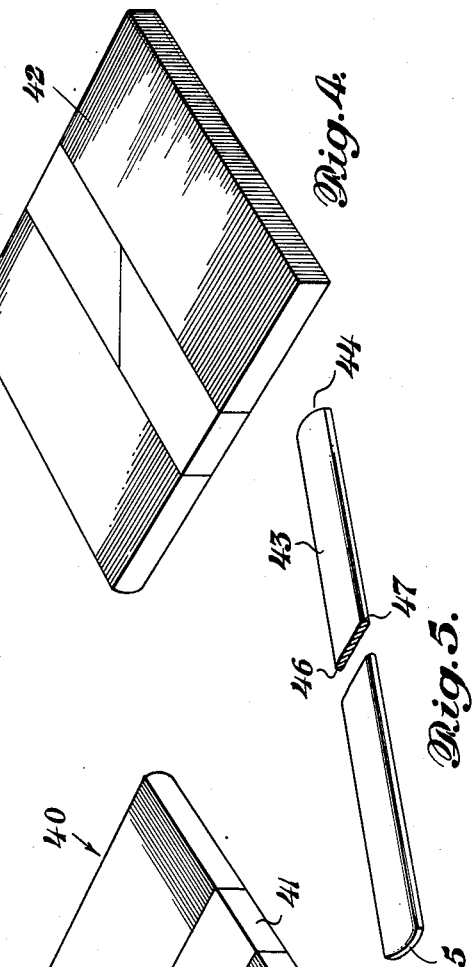
Inventor
Henry A. Roberge,
By Flocks and Simon
Attorneys Patented Oct. 28, 1952

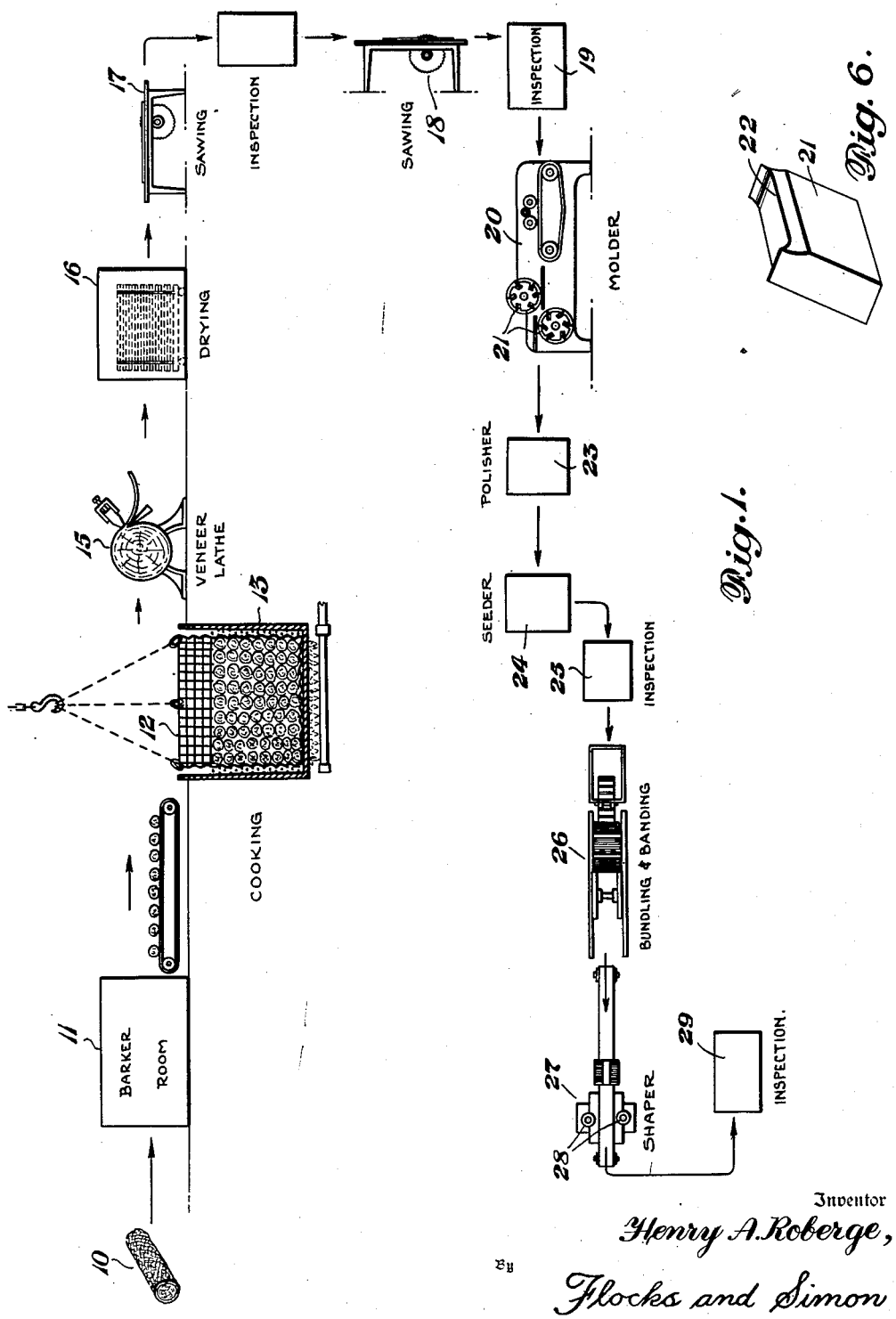

2,615,484

UNITED STATES PATENT OFFICE 2,615,484

PRODUCTION OF STICKS

Henry A. Roberge, Oakland, Maine, assignor, by mesne assignments, to The Diamond Match Company, New York, N. Y., a corporation of Delaware Application January 3, 1947, Serial No. 720,027

3 Claims. (Cl. 144—309)

The present invention relates to the production of sticks or the like. More particularly it relates to a novel process for producing a relatively flat elongated stick of a type especially suitable for insertion into confections such as blocks of ice cream or the like, and to a novel stick of this character.

In general sticks of this character have been prepared from relatively thin veneer by simply chopping the sticks from sheets of veneer after the veneer had been suitably softened by soaking in warm water. In general it was necessary in order to produce a stick in this manner to chop the stick while the wood was in a wet or soft condition and when the wood was thereafter dried a great deal of warping and dimensional change occurred. This made the stick unsuitable in some instances, as an example, for use in automatic machinery which inserted the stick into the confection. In addition, the sticks in some instances had ragged edges and in use there was some danger of slivers or the like to the ultimate consumer. As may be understood inspection of sticks of this character would eliminate some of the worst sticks but it was relatively impracticable to subject each of the sticks to this careful inspection due to the low cost of the final product.

It is one of the objects of the present invention, therefore, to prepare a novel stick for ice cream or other confections which is substantially more uniform in its characteristics and of a better quality than heretofore known.

A second general object of the present invention is to provide a novel process which will insure the preparation of a more uniform stick of the character described.

Other objects and the nature and advantages of the instant invention will be apparent from the following description taken in conjunction with the accompanying drawings, wherein:

Figure 1 illustrates in diagrammatic fashion a flow sheet of the process according to the present invention.

Figure 2 is a partly diagrammatic section of the device for bundling the sticks and rounding the ends thereof.

Figure 3 is a perspective view of a stick bundle with two rounded ends.

Figure 4 is a perspective view of a stick bundle with one rounded end.

Figure 5 is a perspective view partly broken away of a stick.

Figure 6 is a perspective view of one of the knives in the molder.

The process according to the present invention comprises in general taking logs of the usual length and sawing them into suitably sized bolts. The logs are then debarked in the usual manner known in the art and soaked in water at a temperature and for a period of time sufficient to soften the bolt and render the same more easily cut into suitable veneer. For example, the bolts are preferably soaked for about 12 hours in water of 160° F. However, the bolts may be soaked for a longer or shorter period of time at lower or higher temperatures.

Thereafter the softened log is cut into a veneer which is substantially thicker than the thickness of the finished sticks which it is desired to make. In other words, it is preferable that the sheet of veneer produced from the log have an excess thickness of approximately 20% as compared to the thickness of the final finished stick. By thus providing an initial veneer sheet of an over-thickness and later in the process, as will be hereinafter set forth, reducing this thickness, it becomes unnecessary to discard substantial portions of veneer which may have been cut of a reduced thickness. In addition, when the thickness of the veneer is reduced to form the stick, a uniform surface and thickness is produced in the final stick.

Preferably the veneer cutting operation is performed on a veneer lathe provided with a heavy knife and a pressure bar capable of exerting a heavy pressure on the wood being cut. This insures a more uniform veneer and also densifies the veneer structure, thus producing a "tighter" veneer.

Having prepared the sheets of veneer as previously set forth, which are also preferably several times larger than the final cards which will be cut in a final step into sticks, these sheets are cut both cross-wise of the grain and with the grain. After each cutting operation, the product is inspected and sorted and the blanks after each sawing operation may be discarded if the entire blank is unsuitable for further processing. By thus providing several sawing operations and sorting operations between each sawing, the chances of manufacturing any substantial number of sticks which are defective are reduced to a minimum. At the same time, only relatively small sections of wood are completely discarded. It is also desirable, prior to the cutting and sawing, to dry the veneer sheets completely or, in other words, to an extent which will inhibit any further dimensional change. Preferably the sheets prior to the sawing or cutting operation are placed in a drying kiln and are slowly dried to preferably a moisture content of approximately 12%. The moisture content of the sheets at the end of the drying period may in general be varied from about 6% to 14%. Preferably, the period of time utilized for drying is approximately 13 hours. However, this drying time may vary with the type of wood used and with the temperature and humidity control within the dryer.

At the end of the drying and sawing operations, a plurality of cards are produced from a single veneer sheet. These cards should be of the length or approximately the length of the finished stick. They are also substantially thicker than the finished stick, although this thickness may vary depending on the uniformity of cutting of the initial veneer. In general, however, it may be stated that all of the cards are at least as thick as the final sticks and preferably substantially thicker having an over-thickness of approximately 20% or greater.

The veneer cards thus produced are then run through a molder provided with high speed cutter knives shaped so as to be capable of both reducing the thickness of the finished stick and cutting the cards into a plurality of sticks. Preferably this cutting operation is performed with the grain and the cutting knives are shaped to provide the sticks with rounded edges. If it is desired thereafter to reduce the length of the sticks or to round the ends thereof, the sticks are subjected to a supplemental operation to round the ends or vary the length. As may be realized, it would be difficult, if not impossible, to grind the end of a single stick, and it is therefore preferable to take the sticks as they come from the final cutting operation and assemble a plurality of these sticks in face-to-face relation. Thereafter a binder of paper, cloth or plastic sheeting is wrapped about a selected number of such assembled sticks and the bundle thus produced is ground as by a suitable grinding wheel to grind off the ends. The assembly of the sticks, counting and wrapping thereof is described and shown in more detail in co-pending application Serial No. 719,987, filed January 3, 1947.

The following specific example serves to illustrate the present process but is not intended to limit the scope thereof.

Referring to Figure 1 of the drawing, logs of conventional length are sawn in the usual manner as indicated diagrammatically at 10 and the bolts, approximately two feet long, thus produced are then conveyed to a barker room 11 where the bark is removed by suitable conventional barkers. Thereafter, from the barkers the debarked bolts are piled into racks 12 and carried in the racks to cooking vats 13 where they are submerged in water at a temperature of approximately 160° F. for a period of time as, for example, twelve hours. In other words, the bolts are submerged in water at such temperature and for a period of time to soften the bolt so that a suitable veneer may be cut therefrom.

The bolts are then veneered on a veneer lathe 15 having a relatively heavy knife of approximately two feet in length and a pressure bar exerting a pressure of approximately 1000 pounds per square inch on the wood, so as to cut sheets of veneer approximately 24" x 31" and of a thickness of approximately .106". Thereafter, the sheets of veneer are stacked on platforms with suitable separator strips between each layer of veneer and dried in a kiln indicated at 16. In the drying kiln controlled heat and moisture conditions are maintained so that the moisture content of the veneer is reduced to approximately 12 percent in a period of time of approximately 13 hours. The dry veneer is then initially cut with the grain of the sheets by gang saws as indicated at 17, to form slats approximately two feet long and $6\frac{9}{16}$ inches wide. Thereafter the slats thus produced are carefully sorted and inspected to eliminate strips of veneer which are unsuitable for further processing. The slats are then sawed once again as indicated at 18 against the grain to produce $4\frac{33}{64}"$ lengths, thus producing cards of veneer measuring $6\frac{9}{16}" \times 4\frac{33}{64}$. After this second sawing operation, the cards are given a second sorting or inspection as indicated at 19. Here again the cards which are unsuitable for further processing are then eliminated. As may be understood by providing for a second inspection after the second operation, it is possible to process slats into cards which are not suitable throughout their area for a further processing and to then eliminate those areas after the second sawing operation.

The cards after sawing are then run through a molder which is indicated at 20. As may be understood, the upper knives and the lower knives are rotated at a very high rate of speed and the knives 21 serve to cut the cards into sticks. By suitably shaping the knives 21, as indicated at 22 (Fig. 6), the edges of the sticks are given a rounded shape and the knives serve to plane the surface of the sticks so that after the molder operation the sticks are provided with a uniform thickness and a smooth surface. By utilizing a molder instead of merely chopping the sticks, cards can be used which are previously dried since the heavy speed molder will cut the dry wood to a suitable shape. There is therefore no subsequent variation in the width or thickness of the stick and in producing a stick $4\frac{33}{64}"$ long, $\frac{3}{8}"$ wide and .088" thick, it has been possible to hold the tolerances to a plus or minus .002" in width and plus or minus .001" in thickness.

From the molders, the sticks are blown or otherwise transported to the polishers indicated at 23 and seeders indicated at 24. At the seeders 24 imperfect sticks are automatically sorted from the pile of finished polished sticks. Thereafter the remaining sticks are dropped on to a sorting table with a moving conveyor at the bottom thereof and given a third inspection. The sorting table is indicated at 25. After the sticks have been sorted and the few bad sticks resulting from the process thus far eliminated, the sticks are bundled on a bundling machine indicated at 26. This bundling machine is preferably of the character described in co-pending application Serial No. 719,987 and the sticks are lined up in this machine in face-to-face relation and separated into bundles of fifty and provided with a suitable wrapper. The bundles of fifty sticks then pass through a router or shaper indicated at 27 where grinding wheels 28 grind off the edge in an arc, as for example $\frac{3}{8}"$, so that the bundles of sticks are provided with rounded ends. The stick bundles are then given a final inspection as indicated at 29.

Referring to Figure 2 there is here shown by way of example, an apparatus for assembling the sticks in face-to-face relationship and for counting and wrapping the stick bundles so produced. There is also shown in somewhat diagrammatic fashion, means for grinding the ends of the sticks when so assembled in stick bundles. As previously pointed out, a bundling machine is described in greater detail in co-pending application Serial No. 719,987. The bundling machine 26 includes a hopper 30 which receives the sticks from a suitable conveyor or sorting table. The sticks are picked up from the hopper by a drum 31 and are ejected from slots in the drum by an ejector indicated at 32. The ejector 32 also aligns the sticks in face-to-face relationship in a feed track 33 in which the sticks are kept under tension by a follower 34 connected to a weight 35. The track 33 feeds into slots in a turret 36 which is manually revolved when a predetermined number of sticks has filled one of the slots of the turret. The operator of the turret also wraps a wrapper about the sticks and places the wrapped bundle of sticks so produced on a conveyor 37 which is provided with a series of clamps indicated at 38. The conveyor 37 carries the stick bundles clamped thereto past a grinding wheel 39 which grinds or rounds the ends of the sticks. A supplemental grinding wheel may also be provided to round the other ends of the sticks. The stick bundle containing sticks rounded at both ends is shown in Figure 3 and indicated in general at 40. The wrapper 41 which, as previously stated, consists of any suitable sheet material, serves to hold the sticks together and the completed package has been found especially suitable for use in automatic machinery for the manufacture of confections supported by a stick.

In Figure 4 a modified form of stick bundle is shown at 42. In this type of stick, only one end is rounded.

In Figure 5 a single stick is shown. It will be noted that the stick 43 is provided with round ends 44 and 45 and round edges 46 and 47.

It will be obvious to those skilled in the art that various changes may be made without departing from the spirit of the invention and therefore the invention is not limited to what is shown in the drawings and described in the specification but only as indicated in the appended claims.

I claim:

1. A process for the manufacture of sticks or the like comprising cutting sheets of veneer from a log, said sheets being substantially larger in all their dimensions than the finished sticks, cutting said sheets both with the grain and cross-grain the cross-grain cuts being spaced along the grain the final length of the finished sticks while sorting after each successive cutting to eliminate defective portions of the sheets and to produce veneer cards of substantially the final length of the finished stick and substantially thicker than the finished stick, and thereafter simultaneously cutting said cards into sticks and reducing the thickness thereof.

2. A process for the manufacture of stick or the like comprising, cutting sheets of relatively thick veneer from a log, sorting said sheets to eliminate defective sheets, cutting said sheets in both longitudinal and transverse direction to provide cards the transverse cuts being spaced along the grain the final length of the finished stick, sorting after each successive cut to eliminate defective cards, and thereafter simultaneously cutting said cards into sticks and reducing the thickness thereof.

3. A process for the manufacture of sticks or the like comprising cutting sheets of relatively thick veneer from a log, simultaneously cutting said sheets into sticks and reducing the thickness thereof, assembling a plurality of said sticks in face-to-face relation, winding a wrapper about a predetermined quantity of said assembled sticks and thereafter rounding at least one of the ends of said wrapped sticks.

HENRY A. ROBERGE.

REFERENCES CITED

The following references are of record in the file of this patent:

UNITED STATES PATENTS

| Number | Name | Date |
| --- | --- | --- |
| D. 102,076 | Cariffe | Nov. 24, 1936 |
| 175,896 | Anderson | Apr. 11, 1876 |
| 205,382 | Hanvey | June 25, 1878 |
| 647,625 | Gilmour | Apr. 17, 1900 |
| 907,979 | Emens et al. | Dec. 29, 1908 |
| 1,118,421 | Hutchinson | Nov. 24, 1914 |
| 1,435,594 | Elmendorf | Nov. 14, 1922 |
| 1,528,488 | Kelley | Mar. 3, 1925 |
| 1,670,657 | Friede | May 22, 1928 |
| 2,159,634 | Pitt | May 23, 1939 |
| 2,340,532 | Jackson | Feb. 1, 1944 |
| 2,355,572 | Contratto | Aug. 8, 1944 |